W. PATERSON.
MEANS FOR CONTROLLING THE DISCHARGE OF LIQUID FROM FILTERS AND THE LIKE.
APPLICATION FILED MAR. 25, 1912.
1,035,999.
Patented Aug. 20, 1912.
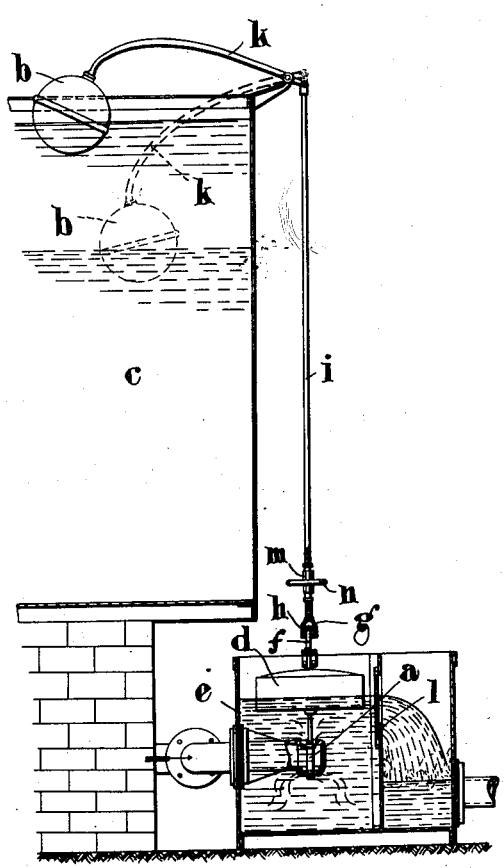

UNITED STATES PATENT OFFICE.

WILLIAM PATERSON, OF LONDON, ENGLAND.

MEANS FOR CONTROLLING THE DISCHARGE OF LIQUID FROM FILTERS AND THE LIKE.

1,035,999.

Specification of Letters Patent.

Patented Aug. 20, 1912.

Application filed March 25, 1912. Serial No. 685,976.

*To all whom it may concern:*

Be it known that I, WILLIAM PATERSON, a subject of the King of Great Britain and Ireland, and residing at Amberley House, Norfolk street, Strand, in the county of London, England, engineer, have invented certain new and useful Improved Means for Controlling the Discharge of Liquid from Filters and the Like, of which the following is a specification.

This invention relates to improved means for controlling the discharge of liquid from filters and the like.

In order to insure successful filtration it is necessary that the filtration process should commence gradually after the cleansing of the filter bed has been carried out and also that under no circumstances should the rate of flow through the filter become excessive.

The object of the present invention is to devise means which shall secure the above results and the invention consists in providing the filter or the like with an outlet regulating valve subject to control by both the level of water above the filter bed and the level of water in the discharge box.

The invention more specifically consists in providing an outlet valve subject to control by two floats or the like located respectively in the filter and in the discharge box.

The invention also comprises means for regulating the outlet controller in relation to the level of water above the filter bed and other details hereinafter more particularly referred to.

The accompanying drawing illustrates in sectional elevation one convenient form of apparatus constructed in accordance with the present invention.

In carrying my invention into effect in one convenient manner I make the outlet valve preferably in the form of an equilibrium valve $a$ normally in its open position but adapted to be closed by a float $b$ on the surface of the water above the filter bed $c$ when the level falls below a predetermined point. Further, the outlet valve is adapted in any suitable manner to be also controlled by a float $d$ in the discharge box $e$; for example, I may secure to the outlet valve $a$ or to the controlling float $d$ a stem $f$ having a projection $g$ thereon engaging in a slot or slot-like container $h$ in the end of the link $i$ secured to the pivoted arm $k$ of the float $b$ in the water above the filter bed. With such an arrangement it will be seen that when the cleansing of the filter-bed has been complete the control valve $a$ is held in its closed position by the float $b$ in the main filter but is allowed to gradually open as the water flows in above the filter-bed until, when the water above the filter-bed has reached a pre-determined level, the valve is quite free from control by the main float $b$ and is then subject to control only by the float $d$ in the discharge box. The latter is fitted with a weir $l$ and the arrangement is such that when the level rises to the height determined by the maximum allowable rate of discharge as measured by the discharge weir $l$ the auxiliary float partially closes the outlet valve.

When such a device as that above described is employed with a battery of filters each filter is provided with its own control valve and it is desirable that convenient means for regulating the position of the outlet controller with reference to the level of water above the filter-bed should be provided so that each filter may discharge the same volume of water. This may be effected by providing an adjustable connection such as a right and left-hand screw working in a nut $m$ and operated by a hand-wheel $n$ or the like, the arrangement serving to regulate the position of the outlet valve with respect to their control floats, gage notches being conveniently provided on the inspection boxes so as to afford ready means for ascertaining the rate of discharge from each filter.

The invention is not to be confined to the details of construction hereinbefore given by way of example nor to any particular type of valve that may be employed for the outlet controller, and I modify the arrangement of the various parts to suit the form of valve that is to be employed and the type of filter or the like to which it is to be applied.

Having now described my invention what I claim as new and desire to secure by Letters Patent is:—

1. In filtering apparatus, the combination of a discharge box, an outlet valve, and means for opening and closing said valve controlled by both the level of water above the filter-bed and the level of water in the discharge box.

2. In filtering apparatus, the combination of a discharge box, an outlet valve and means for opening and closing said valve comprising a float in the water above the filter bed and a float in the discharge box.

3. In filtering apparatus, the combination of discharge box, an outlet valve, a float in the water above the filter bed, a second float in the water in the discharge box attached to said valve and two rods slidably connected with one another and connected to said floats.

4. In filtering apparatus, the combination of discharge box, an outlet valve, a float in the water above the filter bed, a second float in the water in the discharge box attached to said valve and two rods slidably connected with one another and connected to said floats, and means for adjusting the position of the floats in relation to one another.

5. In filtering apparatus the combination of discharge box, outlet valve, a float in the water above the filter bed, a second float in the discharge box, connected with both the first float and the outlet valve, and a weir in the discharge box.

6. In filtering apparatus, the combination of a discharge box, a balanced outlet valve, a float in the water above the filter bed, a second float in the discharge box connected with both the first float and the outlet valve, means for adjusting the position of the floats in relation to one another and a weir in the discharge box.

In testimony whereof I have signed my name to this specification in the presence of two subscribing witnesses.

WILLIAM PATERSON

Witnesses:
W. WARREN TRIGGS,
BERTRAM H. MATTHEWS.